April 6, 1965 F. R. SMITH 3,177,299

MAGNETIC TAPE TRANSDUCING APPARATUS

Filed Sept. 15, 1960 3 Sheets-Sheet 1

INVENTOR

FRANCIS RAWDON SMITH

BY Raymond W. Colton

ATTORNEY

April 6, 1965 F. R. SMITH 3,177,299

MAGNETIC TAPE TRANSDUCING APPARATUS

Filed Sept. 15, 1960 3 Sheets-Sheet 2

INVENTOR
FRANCIS RAWDON SMITH

BY Raymond W. Cotton
ATTORNEY

MAGNETIC TAPE TRANSDUCING APPARATUS

Filed Sept. 15, 1960 3 Sheets-Sheet 3

INVENTOR
FRANCIS RAWDON SMITH

BY Raymond Wolton
ATTORNEY

United States Patent Office 3,177,299
Patented Apr. 6, 1965

3,177,299
MAGNETIC TAPE TRANSDUCING APPARATUS

Francis Rawdon Smith, 1735 20th St. NW., Washington 9, D.C.

Filed Sept. 15, 1960, Ser. No. 56,252
20 Claims. (Cl. 179—100.2)

This invention relates to magnetic tape transducing apparatus employed for the production of one or more duplicate magnetic tapes to correspond with an existing master tape.

Heretofore the duplication of magnetic tapes at speeds which are high as compared with the normal recording and reproducing speeds has introduced various types of noise and distortion which are highly objectionable. Moreover, prior equipment has failed to produce uniform tape tension at the transducing heads under the varying reel diameters encountered as the tape is wound upon and unwound from the reels.

In addition to overcoming these disadvantages of previously known equipment, the present invention makes possible a number of advantages representing further important advances in the art.

It is among the objects of the present invention to provide magnetic tape transducing apparatus comprising take-off and take-up reel supports; a driving mandrel, tape guides and a transducing head intermediate the supports defining a tape path; and driving means for the take-up reel support and mandrel; the transducing head occupying a position intermediate the mandrel and take-up reel support. The pay-off and take-up reel supports preferably include adjustable slip clutches. A retractable pressure roller occupies an operative position in which it bears upon the tape to maintain it in contact with the mandrel and the pressure roller is preferably spring biased towards the mandrel in this operative position. The pressure roller also occupies a retracted position when desired in which it is spring biased in a direction away from the mandrel against a stop. Each of the tape guides preferably includes a pair of glass flanges having a separable spacer interposed between them and the flanges are preferably spring loaded against the spacer. A tape guide is preferably interposed between the head and take-up reel support so as to deflect the tape path at an angle producing substantially uniform tape tension at the head regardless of the diameter of the tape on the take-up reel at any time. This condition has been achieved by maintaining the tape path between the guide and take-up reel support at an angle within the range of 20° to 60° with respect to the tape path between the head and guide. The mandrel is preferably a hard-coated non-magnetic material such as aluminum on which an aluminum oxide surface has been produced. The reel supports and mandrel preferably have parallel horizontal axes lying in different vertical planes.

It is also among the objects of this invention to provide magnetic tape transducing apparatus comprising a plurality of transducing units each having pay-off and take-up reel supports; each having tape guides and a transducing head defining a tape path; a common mandrel lying in the paths; and driving means for the take-up reel supports and mandrel; the transducing heads occupying positions intermediate the take-up reel supports respectively, and the mandrel. One of these transducing heads may be a reproducing head and at least one of the heads is a recording head, the heads being electrically interconnected. The tape paths preferably include the periphery of the mandrel over an arc exceeding 150° and of the order of 180°. Slip clutches are preferably interposed between each take-up reel and its driving means. The units are preferably mounted on a common frame, and electrical circuits interconnecting the heads, including oscillator and amplifier circuits, are also mounted on the frame. The mandrel preferably provides peripheral portions of equal circumferences for the several tape paths.

A more complete understanding of the invention will follow from a description of the accompanying drawings wherein.

Figures 1, 14:
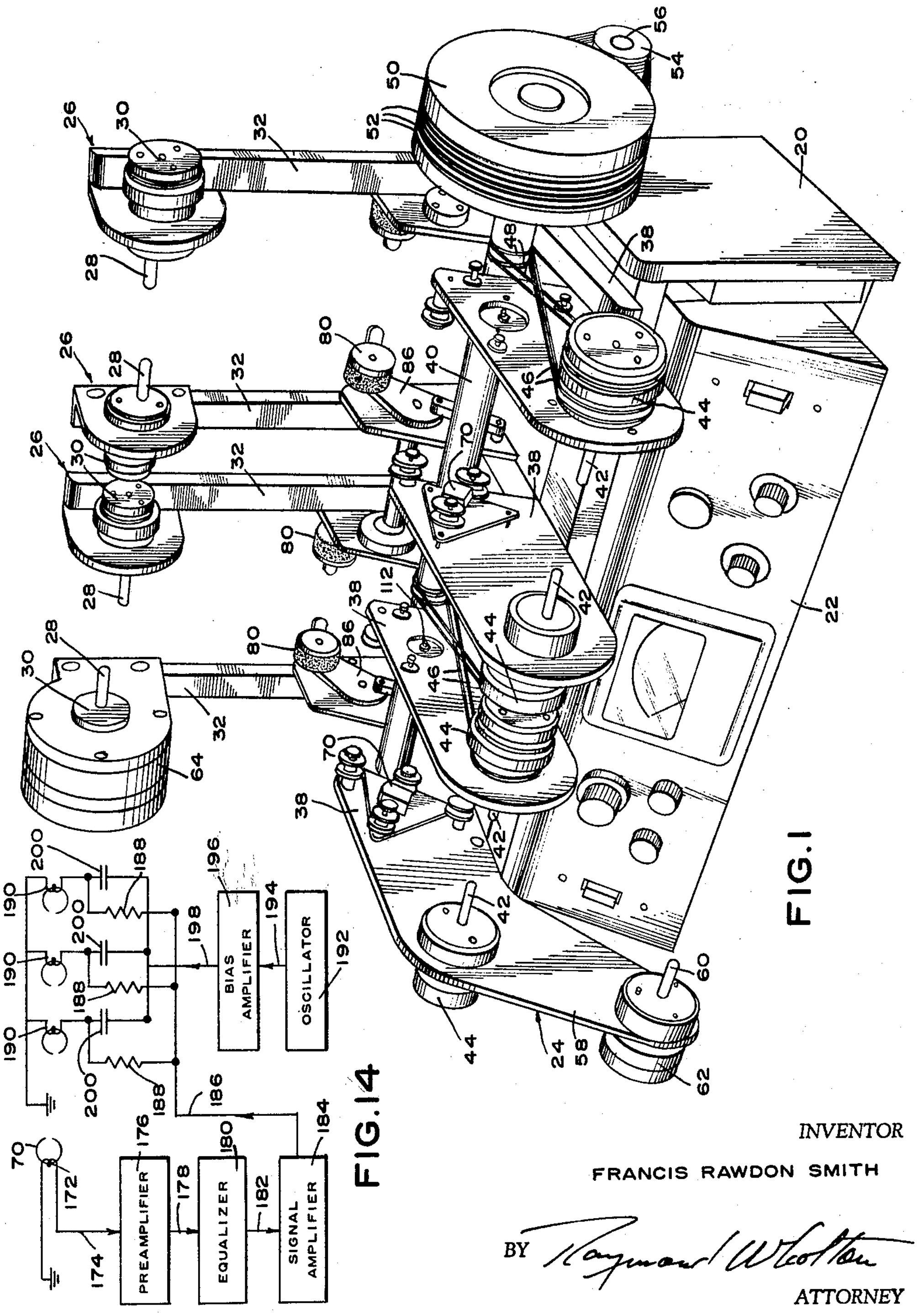
FIG. 1 is a perspective view of tape transducing apparatus embodying the present invention.
FIG. 14 is a block diagram depicting the circuits employed for interconnecting the reproducing and recording heads.

The magnetic tape duplicating apparatus depicted in FIG. 1 includes four units mounted on a frame 20 which also supports a housing 22 containing the electrical components and circuits serving the units. The master unit 24 receives the magnetic tape to be duplicated and each of the several recording units 26 receives a magnetic tape from which a copy of the master is to be produced.

Each of the units provides a pay-off reel support 28 containing a clutch 30 mounted on a vertical column 32 which is secured by means of a corner plate 34 to a horizontal bar 36 bolted or otherwise suitably secured to the frame 20. Each horizontal bar 36 has a mounting plate 38 secured thereto in spaced relationship to the corner plate 34 so that a common mandrel 40 can extend between them. The forward end of each mounting plate 38 carries a take-up reel support 42 carried by a pulley 44 containing a clutch. Each of these pulleys 44 receives a pair of crossed belts 46 received in grooves 48 formed in the mandrel 40 which drives them. The mandrel is driven by a pulley 50 connected by means of a plurality of belts 52 with a smaller pulley 54 mounted on the shaft 56 of a motor, not shown. The master unit 24 provides an arm 58 depending from and integral with the mounting plate 38 to provide a pay-off reel support 60 incorporating a clutch 62 for use in rewinding the master tape. Also used in this rewinding operation is a motor 64 connected with the reel support 28 which serves to support the pay-off reel during the reproducing cycle and the take-up reel during the rewind cycle.

Figures 10, 11, 12, 13:
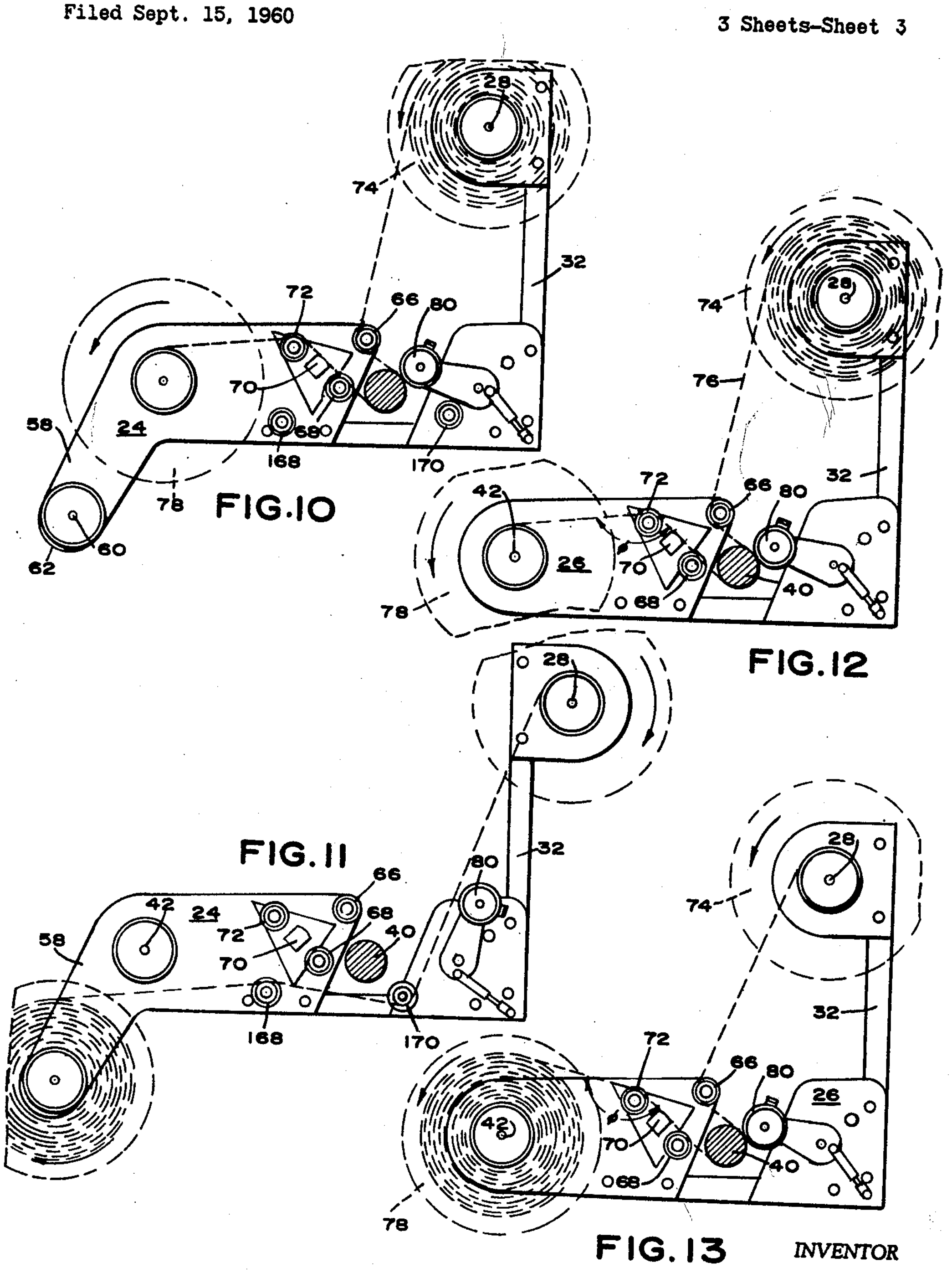
FIG. 10 is an elevation of one of the units depicting the tape path during a reproducing cycle.
FIG. 11 is an elevation of the unit of FIG. 10 depicting the tape path during a rewinding operation.
FIG. 12 is an elevation of another unit depicting the tape path during the early stages of a recording operation.
FIG. 13 is an elevation of the unit of FIG. 12 depicting the tape path during a latter portion of a recording operation.

Each of the mounting plates 38 supports a tape guide 66 between the pay-off reel support 28 and the mandrel 40, a tape guide 68 between the mandrel 40 and the head 70, and a tape guide 72 between the head 70 and the take-up reel support 42. Referring to FIG. 12, there has been depicted a reel 74 bearing a substantial quantity of tape 76 mounted on the pay-off reel support 28. The tape receives a path from the reel 74, around the guide 66, in contact with the lower portion of the mandrel 40 through an angle of approximately 180°, over the guide 68 in contact with the head 70, over the guide 72 to the hub of the take-up reel 78 on which it is wound by the rotation imparted to the take-up reel support 42 by the pulley 44 and belts 46. The drive ratios afforded by the mandrel and pulleys 44 is such that the pulley speed is always in excess of that required to take up the tape at the speed at which the tape itself is driven by the mandrel, thus utilizing the slip clutches between the pulley 44 and the take-up reel support or spindle 42. After the tape has been threaded in the manner described, a pressure roller 80 having a neoprene or other suitable elastomer tire 82 is lowered from the retracted full line position depicted in FIG. 5 and determined by a stop 84, to the operative broken line position in which it will press the tape against the mandrel 40. The axial dimension or width of the tire 82 exceeds the width of the magnetic tape and the composition of the tire is such that when the tire bears against the coated surface of the tape, the entire cross section of the tape displaces the tire, whereby portions of the tire lying axially beyond the tape will bear directly against the mandrel 40. In this way, the mandrel drives the pressure roller which in turn drives the tape. The roller 80 is connected to an arm 86 by means of a pivot 88, the arm being in turn connected to the corner plate 34 by means of a pivot 88. The arm is shifted between its position against the stop 84 to its operative position by means of a handle 87. A spring pressed toggle member 90 is connected to the lower portion of the arm 86 by means of a pivot 92 and receives a complementary toggle member 94 connected to the corner plate 34 by means of a pivot 96. The toggle member 90 provides a socket receiving a spring 98 which bears against the toggle member 94 so that the spring will maintain the pressure roller 80 in either its operative position in contact with the tape and mandrel as described, or its retracted position in which the arm 86 engages the stop 84.

Figures 4, 5, 8, 9:
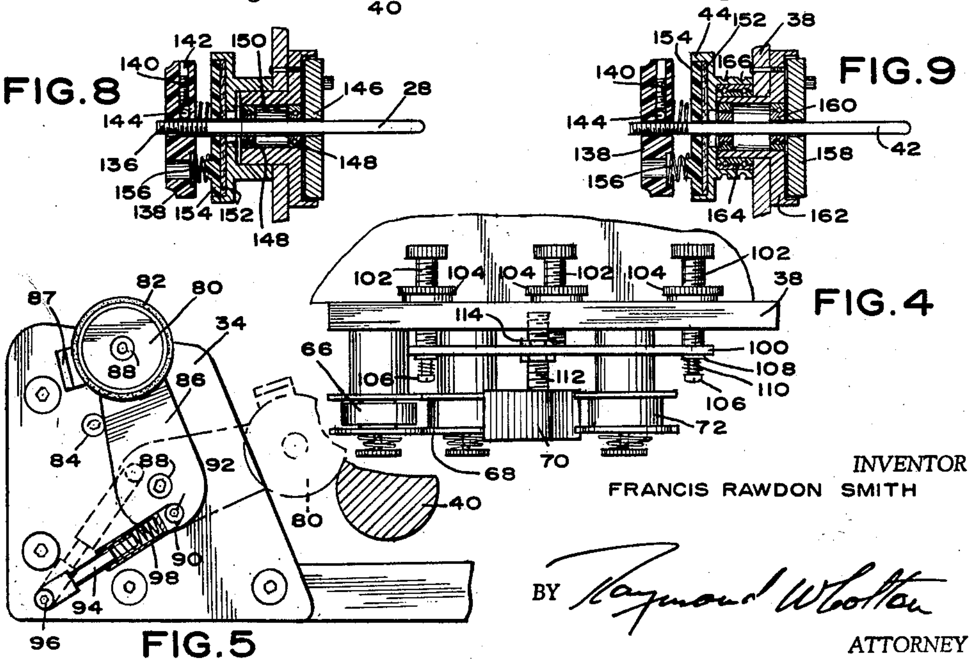
FIG. 4 is a fragmentary portion of the unit of FIG. 3 on an enlarged scale.
FIG. 5 is an elevation on an enlarged scale, partially in section, of a portion of FIG. 2.
FIG. 8 is a sectional elevation on an enlarged scale taken along line 8—8 of FIG. 2.
FIG. 9 is a sectional elevation on an enlarged scale taken along line 9—9 of FIG. 2.

The head 70 is suitably secured to a head mounting plate 100 which is in turn adjustably secured in a universally adjustable fashion to the mounting plate 38. The head mounting plate 100 as shown in FIG. 4 is supported at its three corners by adjusting screws 102 threaded through the mounting plate 38. Each of these screws is provided with a locking nut 104 for retaining any desired setting. The head mounting plate 100 bears against the ends of these adjusting screws 102 which are internally threaded to receive screws 106 providing washers 108 in engagement with the opposite surface of the head mounting plate 100 and carrying springs 110 interposed between the heads of these screws and their washers. Thus it will follow that the head 70 will be universally supported in a yieldable manner for very precise adjustment with respect to the tape path involved. The head itself is secured to the head mounting plate 100 by means of a threaded stem 112 receiving a nut 114 so that the head can also be adjusted with respect to its mounting plate 100 about the axis of its supporting stem 112.

Figures 2, 6, 7:
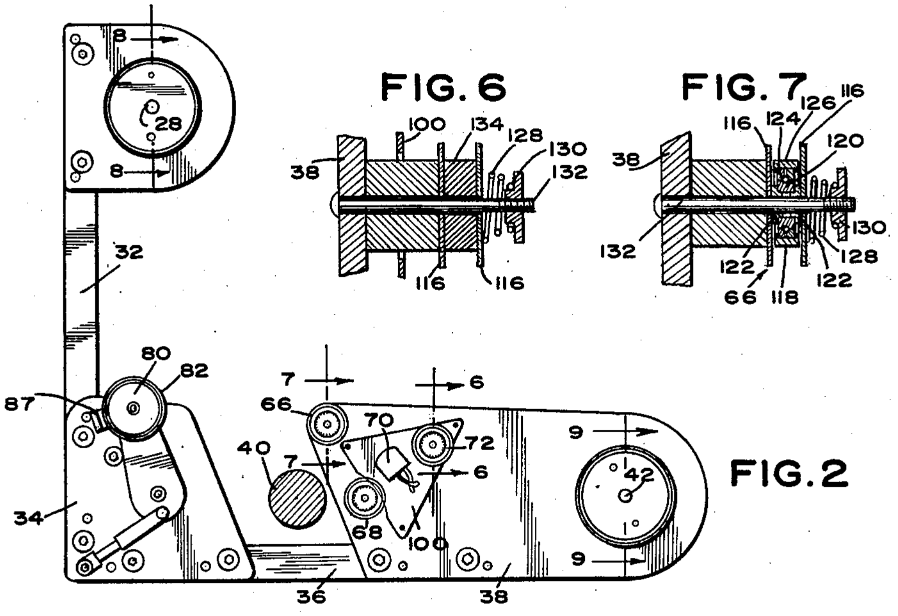
FIG. 2 is an elevation, partially in section, depicting one of the units of the apparatus of FIG. 1.
FIG. 6 is a sectional elevation on an enlarged scale taken along line 6—6 of FIG. 2.
FIG. 7 is a sectional elevation on an enlarged scale taken along line 7—7 of FIG. 2.
Figure 3:
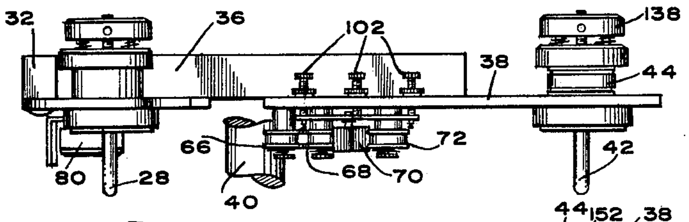
FIG. 3 is a top plan view of the unit of FIG. 2.

The tape guide 66, as best shown in FIG. 7, is made up of a pair of glass flanges 116 separated by a spacer 118 in the form of a ball bearing roller whose inner race 120 is maintained out of contact with the flanges 116 by means of bushings 122 and whose outer race 124 supports a rim 126 providing the tape engaging surface. The annular glass flanges 116 are spring loaded into contact with the bushings 122 by means of a spring 128 pressed against the outer flange 116 and bearing on an adjustable nut 130 received on the threaded end of a shaft 132 carried by the mounting plate 38. The tape guides 68 and 72 are identical with one another and differ from the tape guide 66 in that the spacer is merely an annulus 134 which is not intended to rotate under the frictional force of the tape engaging it. This construction has been shown in FIG. 6 wherein the reference numerals corresponding to those of FIG. 7 have been employed insofar as they are applicable.

The pay-off reel support or spindle 28, as shown in FIG. 8, has a threaded end 136 received in the threaded bore of an annular member 138 to which it is secured in any desired adjusted position by means of a set screw 140 received in a radial bore 142 of the annulus and pressing a nylon ball 144 into engagement with the threads on the spindle end 136. This spindle 28 is secured to a reel driving disk 146 and rotatably mounted in bearings 148 mounted in a socket 150 provided by the frame. Also carried by the frame is a felt or other suitable fabric clutch face 152 upon which bears a clutch shoe 154 driven by the spindle 128 through the annulus 138 connected to the shoe by means of springs 156 received in recesses formed in the annulus 138 and over projections formed on the shoe 154. It will thus be evident that the frictional engagement between the shoe 154 which is preferably formed of Bakelite and the felt facing 152 can be adjusted by loosening the set screw 140 and adjusting the annulus 138 with respect to the threaded end of the spindle 28. In this way the drag on the tape can be adjusted over wide limits.

The take-up reel supports or spindles 42 are likewise secured to reel engaging disks 158 and ride in bearings 160 supported in a housing 162 supported from the mounting plate 38. The spindle 42 has a threaded end received in an annulus 138 like that of FIG. 8 and secured thereto in a similar fashion. This annulus 138 is also coupled with a Bakelite shoe 154 by means of springs 156 for engagement with the felt clutch facing 152 as described with reference to FIG. 8. In this case however, the felt facing 152 is carried on the radial surface of the pulley 44 which is rotatably mounted by anti-friction bearings 164 carried by the member 162. In this case, the belts 46 received by the grooves 166 provided in the pulley 44 will transmit rotation through the clutch face 152, the shoe 154, the springs 156, the annulus 138, and the disk 158 to a take-up reel on which tape is being wound.

As will be apparent from FIGS. 10 and 11, the master unit 24 is provided with two additional tape guides 168 and 170, similar to those already described, for use in the rewinding operation schematically depicted in FIG. 11. In the rewind operation, the motor 64 is employed and the pay-off reel now mounted on the pay-off reel support or spindle 60 will receive a drag under the effect of the slip clutch 62 constructed in accordance with the showing of FIG. 8.

Referring to FIGS. 12 and 13, it will be evident that as the diameter of the take-up reel increases by the addition of tape on this reel, the angle of wrap around the tape guide 72 progressively decreases tending to increase the tension of the tape at the head. However, simultaneously, as a result of the increasing diameter, the pull on the tape is being reduced; by properly locating the guide 72, these two effects can be made to compensate one another so as to maintain a substantially constant tape tension at the head 70 where such a condition is so important. The angular relationship referred to has been identified by the reference character $\phi$.

Inasmuch as the transducing head 70 is interposed between the tape driving mandrel 40 and the take-up reel 78 in each case, the equipment is entirely independent of faulty reeling or other effects which have created such substantial problems in the past.

The belts which have produced the best results in this equipment are conventional O-rings. In lieu of the slip clutches described, torque motors are contemplated for certain applications of the present invention.

As shown in FIG. 14, the reproducing head 70 has its winding 172 connected by a lead 174 to the input of a preamplifier 176 whose output is connected by a lead 178 to the input of an equalizer 180. The equalizer output is connected by a lead 182 to the input of a signal amplifier 184 whose output is fed by a lead 186 through resistors 188 to the windings 190 of the recording heads. The output of an oscillator 192 is fed by a lead 194 to a bias amplifier 196 whose output lead 198 is connected to the windings 190 of the recording heads through capacitors 200. All of these electrical components and circuits are contained within the housing 22 and assembled as a unit on the same frame 20 with the mechanical portions of the apparatus so as to afford a maximum degree of compactness and portability consistent with the precision requirements of such equipment.

Whereas only one specific embodiment of the present invention has been described, the many variations that will be suggested thereby to those skilled in the art are contemplated by the appended claims.

I claim:

1. Magnetic tape transducing apparatus comprising pay-off and take-up reel supports; a driving mandrel, tape guides and a transducing head intermediate said supports defining a tape path having a direction of travel towards said take-up reel support; means energizing said head when said tape is travelling in said direction; and driving means for said take-up reel support and mandrel; said transducing head occupying a position intermediate said mandrel and take-up reel support, said head lying between a pair of said guides, and said head and pair of guides lying on the same side of said path.

2. Magnetic tape transducing apparatus according to claim 1 wherein said pay-off reel support contains an adjustable slip clutch.

3. Magnetic tape transducing apparatus according to claim 1 wherein said take-up reel support contains an adjustable slip clutch.

4. Magnetic tape transducing apparatus according to claim 1 wherein a retractable pressure roller occupies an operative position in contact with said mandrel and including said tape path.

5. Magnetic tape transducing apparatus according to claim 4 wherein said pressure roller is spring biased towards said mandrel.

6. Magnetic tape transducing apparatus according to claim 4 wherein said pressure roller has a retracted position in which it is spring biased away from said mandrel.

7. Magnetic tape transducing apparatus according to claim 1 wherein each of said tape guides includes a pair of glass flanges having a separable spacer interposed therebetween.

8. Magnetic tape transducing apparatus according to claim 7 wherein said flanges are spring loaded against said spacer.

9. Magnetic tape transducing apparatus according to claim 1 wherein a tape guide is interposed between said head and said take-up reel support in a position maintaining the tape path between said guide and take-up reel support at an angle within the range of 20° to 60° with respect to the tape path between said head and guide.

10. Magnetic tape transducing apparatus according to claim 1 wherein a tape guide is interposed between said head and said take-up reel support deflecting said tape path at an angle producing substantially uniform tape tension at said head.

11. Magnetic tape transducing apparatus according to claim 1 wherein said mandrel is a hard-coated non-magnetic material.

12. Magnetic tape transducing apparatus according to claim 1 wherein said reel supports and mandrel have horizontal axes lying in different vertical planes.

13. Magnetic tape transducing apparatus according to claim 1 wherein said reel supports and mandrel have parallel horizontal axes.

14. Magnetic tape transducing apparatus comprising a plurality of transducing units each having pay-off and take-up reel supports; each having tape guides and a transducing head defining a tape path having a direction of travel towards said take-up reel support; means energizing said head when said tape is travelling in said direction; a common mandrel lying in said paths; and driving means for said take-up reel supports and mandrel; said transducing heads occupying positions intermediate said take-up reel supports respectively, and said mandrel, each said head lying between a pair of said guides, and each said head and its said pair of guides lying on the same side of their tape path.

15. Magnetic tape transducing apparatus according to claim 14 wherein one of said transducing heads is a reproducing head, at least one of said transducing heads is a recording head, and said heads are electrically interconnected.

16. Magnetic tape transducing apparatus according to claim 14 wherein said heads are electrically interconnected.

17. Magnetic tape transducing apparatus according to claim 14 wherein said tape paths include the periphery of said mandrel over an arc exceeding 150°.

18. Magnetic tape transducing apparatus according to claim 14 wherein a slip clutch is interposed between each said take-up reel and its driving means.

19. Magnetic tape transducing apparatus according to claim 14 wherein said units are mounted on a common frame, and electrical circuits interconnecting said heads, including oscillator and amplifier circuits, are also mounted on said frame.

20. Magnetic tape transducing apparatus according to claim 14 wherein said mandrel provides peripheral portions of equal circumferences in said tape paths.

References Cited by the Examiner

UNITED STATES PATENTS

| | | | |
|---|---|---|---|
| 2,560,234 | 7/51 | Masterson | 179—100.2 |
| 3,050,225 | 8/62 | Ulman | 242—55.12 X |
| 3,091,380 | 5/63 | Harris | 226—50 |

OTHER REFERENCES

Magnetic Recording, S. S. Begun; 1949; Murray Hill Books, Inc., New York; pp. 119, 120, and 144–147.

IRVING L. SRAGOW, *Primary Examiner.*

NEWTON N. LOVEWELL, *Examiner.*